Patented Aug. 29, 1950

2,520,806

UNITED STATES PATENT OFFICE 2,520,806

WELDING ELECTRODE

Theodore E. Kihlgren, New Providence Township, Union County, and George R. Pease and Pierre E. Le Grand, Plainfield, N. J., assignors to The International Nickel Company, Inc., New York, N. Y., a corporation of Delaware No Drawing. Application November 22, 1949, Serial No. 128,906

9 Claims. (Cl. 219—8)

The present invention relates to a welding electrode containing a nickel base core and, more particularly, to a welding electrode containing a nickel-copper alloy core provided with a special flux coating especially suited for depositing of weld metal upon steel plate or upon alloy steel plate, such as 18–8 stainless steel and special ferritic types of nickel steels.

The new welding electrode embodying the present invention is specially designed for D. C. welding operations to produce crack-free welds or overlays having a high degree of ductility in an as-welded condition or after conventional stress-relieving heat treatment and to be virtually or completely free of weld porosity as determined by radiographic examination in the production of weldments of the various types of metals referred to herein.

The new electrode embodying the present invention combines a nickel-copper alloy core with a special type of flux coating containing sufficient amounts of calcium carbonate to be effective to keep the carbon at a desirable low level which has been found important in obtaining satisfactory ductile deposits, especially after stress-relieving heat treatments at about 1150° F.

The novel electrode embodying the invention is further designed to produce a weld metal having a residual columbium content in an amount adequate to effectively reduce hot-cracking tendencies.

The advantages and improved properties of the novel coated welding rod are obtainable with a nickel base core and preferably with a core wire having a composition containing as its essential elements about 70.0% nickel and about 30.0% copper with other alloying elements and having a flux coating including calcium carbonate, bentonite and ferro-columbium together with a suitable binder and in the proportions given herein. In the flux coating, the calcium carbonate and ferro-columbium contents in particular are in such critical amounts as to function to produce the desired conditions and properties of the weld metal.

The production of the effective and satisfactory welding electrode provided with a nickel-copper alloy core and capable of producing ductile crack-free overlays and fusion welds in accordance with the invention results from our discovery that control of the carbon content of nickel-copper alloy overlays on steel or in the welding of steel members was important in obtaining ductile deposits, especially after stress-relieving heat treatments at the conventional temperature of about 1150° F. In this connection, it was also found that the higher the iron content of the overlay or fusion metal, the more detrimental was the effect of the carbon content upon the ductility of the deposit. Tests have also shown that the presence of columbium in the overlay or weld metal was important in minimizing the weld hot cracking and in addition neutralizing the deleterious effects of elements such as sulfur and lead. It was further found that the columbium likewise appears to increase the tolerance for carbon, probably by preventing the rejection of graphite and subsequent weakening effect.

It is an object of the present invention to provide a nickel-copper alloy welding electrode capable of producing sound welds having a minimum tendency to hot cracking and having a high degree of ductility and being devoid of gas porosity.

Another object of the invention is to provide a welding electrode containing a nickel base core and having a coating containing a critical calcium carbonate content effective to keep the carbon at a suitable low level so as to be effective in producing fusion deposits suitable for the uniting or joining of weld metal to members or plates of generally similar composition and to various unlike metals or alloys, such as 18–8 stainless steel, mild steel or to special ferritic nickel steels.

The invention also contemplates the provision of a welding electrode containing a nickel-copper alloy core and having a special lime-fluorspar flux coating having a critical and controlled carbonate content in such proportions as to importantly contribute in obtaining sound crack-free welds having a high degree of ductility.

It is a further object of the invention to provide a welding electrode containing a nickel-copper alloy core and having a lime-fluorspar flux coating having a critical and controlled carbonate content and also a columbium content so as to obtain sound welds having a high degree of ductility and a minimum degree of hot cracking tendency.

The present invention likewise contemplates the provision of a welding electrode containing a nickel-copper alloy core and having a lime-fluorspar type of flux coating having a critical and controlled carbonate content and cryolite content so as to be conducive to obtaining sound welds having a high degree of ductility and substantially free of porosity.

A still further object of the invention is to provide a welding electrode containing a nickel-copper alloy core and having a lime-fluorspar type of flux coating having critical and controlled contents of calcium carbonate, cryolite and columbium, and desirably titania, so as to be effective to produce a stable arc and a readily removable slag, said electrode producing a fusion weld of sound and ductile properties free of hot-cracking tendencies and virtually free of weld porosity.

Other objects and advantages will become apparent from the following description.

Broadly stated, the present invention contemplates the provision of a welding rod containing a nickel base core and having a special flux coating containing critical and controlled amounts of calcium carbonate for keeping the carbon at a desirably low level for obtaining satisfactory ductile deposits, containing critical and controlled amounts of cryolite for favorably causing weld soundness, and containing critical and controlled amounts of ferro-columbium to provide a residual columbium content in the fusion metal adequate to effectively reduce hot-cracking tendencies.

In the preferred embodiment of the present invention, there is provided a welding electrode containing a nickel-copper alloy core and provided with a flux coating containing calcium carbonate in quantity sufficient to keep the carbon content at a low level, containing ferro-columbium in amounts adequate to insure substantial elimination of hot-cracking tendencies, containing cryolite and titania in such quantities as to enhance the soundness of the welds produced, and containing calcium fluoride, bentonite and a suitable binder adapted to the production of a coated electrode suited for producing satisfactory weld deposits of weld metal for the satisfactory joining of nickel-copper alloys, for the joining of nickel-copper alloys to various other alloys or metals, such as steel, 18–8 stainless steel and 8½% nickel steel, and for the satisfactory production of overlays by weld deposits constituted of nickel-copper alloys.

In its preferred embodiment, the improved welding electrode has a core wire having a composition substantially as shown in the following typical analysis given in Table A.

TABLE A

*Core wire*

| Element | Per Cent |
|---|---|
| Carbon | 0.10 |
| Iron | 0.70 |
| Manganese | 0.75 |
| Silicon | 0.25 |
| Titanium | 0.50 |
| Aluminum | 1.70 |
| Copper | 29.5 |
| Nickel | Balance |

In the production of the improved electrode, the lime-fluorspar type of flux coating containing calcium carbonate and ferro-columbium in critical and controlled quantities preferably has the composition given in Table B.

TABLE B

| Flux Coating | Parts by Weight | |
|---|---|---|
|  | Preferred | Range |
| Dry Flux: |  |  |
|     Calcium carbonate | 26 | 20–40 |
|     Calcium fluoride | 16 | 5–35 |
|     Cryolite | 25 | 10–35 |
|     Titania | 25 | 0–35 |
|     Ferro-85 manganese | 5 | 0–10 |
|     Ferro-40 titanium | 0 | 0–5 |
|     Bentonite | 3 | 2–5 |
|     Ferro-50 columbium | 16 | 0–25 |
| Binder: |  |  |
|     Sodium silicate | 15.0 | 10–20 |
|     Invert sugar | 2.5 | 1.5–3 |
|     Water | 12.0 | (¹) |

¹ As needed.

The flux coating is desirably applied to the core wire by an extrusion process and dried on the surface of the wire by subjecting it to heat at about 250° F. to about 550° F. which has been found to produce a hard and adherent coating having good welding characteristics and being relatively insensitive to damage by normal handling.

The following combinations of core wire diameters and electrode outside diameters set forth in Table C have been found suitable for the production of sound ductile welds free from weld hot-cracking and free from weld porosity.

TABLE C

| Core Wire | Coated Electrode |
|---|---|
| .075″ diameter | .115″ outside diameter |
| .093″ diameter | .140″ outside diameter |
| .125″ diameter | .190″ outside diameter |
| .156″ diameter | .220″ outside diameter |
| .187″ diameter | .260″ outside diameter |
| .250″ diameter | .325″ outside diameter |

The results of tests are given in the following illustrative examples, the data of which will give those skilled in the art a better understanding of the invention.

EXAMPLE 1

In a test designed to illustrate the efficiency of the improved electrode in producing ductile overlays of a nickel base, copper-containing alloy on steel plate, welded deposits were made employing electrodes of ⅛″, ₅⁄₃₂″ and ₃⁄₁₆″ diameter. The electrodes used had core wires made of nickel-copper alloys having the nominal composition given in Table A, which cores were coated with a flux coating identical with that shown in the preferred column of Table B. The overlays consisted in each instance of a single layer, using two overlapping beads for the ₃⁄₁₆″ diameter electrodes and the ₅⁄₃₂″ diameter electrodes and three overlapping beads for the ⅛″ diameter electrodes. The overlays were made on 3″ x 6″ x ⅜″ mild steel plate, the deposit layer being about 1″ wide by 5″ long. The test specimens were stress relieved at about 1150° F. for one and one-half hours, ground to remove weld ripples and to obtain a plane surface and scribed at the center with one-half inch and one inch gauge marks. The test specimens were then given a longitudinal bend over a ¾″ radius using a guided bend jig. Where no failure had occurred at this stage the specimens were further flattened under a compression head. The results of the tests of the nickel-copper alloy overlays on mild steel are shown in Table 1.

TABLE 1

| Weld | Electrode Diameter | Amps. | Elongation at Failure | |
|---|---|---|---|---|
|  |  |  | Per Cent in ½″ | Per Cent in 1″ |
| A | ₃⁄₁₆″ | 160 | ¹ 56 | ¹ 44 |
| B | ₅⁄₃₂″ | 135 | 56 | 46 |
| C | ⅛″ | 95 | ¹ 50 | ¹ 42 |

¹ No failure—specimen flattened.

As will be noted, the test values set forth in Table 1 show a high degree of ductility and an absence of hot cracking.

EXAMPLE 2

In another test, provision was made for simulating conditions in the production of welded joints of nickel-copper alloys clad on steel plate which illustrate the applicability of the electrode to clad metal welding. In accordance with this test indicated as weld "D" in Table 2, two strips 1" wide by .050" thick by 6" long made of nickel-copper alloy having a nominal composition set forth in Table A were tack-welded to a 3" x 6" x ⅜" steel plate leaving a space ¾" wide between the clad alloy strips. This space or groove was then filled in by depositing two layers (of 3 lapping beads each) by the employment of electrodes having the preferred composition given in Tables A and B. The specimen was then stress relieved at about 1150° F. for one and one-half hours, the weld reinforcement was removed, and the longitudinal bend tests were performed as in Example 1. The results of the test of the weld produced are shown in Table 2.

TABLE 2

| Weld | Electrode Diameter | Amps. | Elongation, per cent in ½" |
|------|--------------------|-------|----------------------------|
| D    | ⅛"                 | 90    | 48                         |

The results of this test like those of Example 1 indicate a high degree of ductility and soundness and an absence of hot cracking in the weld.

EXAMPLE 3

In a further test, the effectiveness of the electrode embodying the invention is demonstrated in its applicability to the joining of members of dissimilar metals. The electrodes comprise core wire having a composition given in Table A and having a flux coating of the preferred composition set forth in Table B. In making these tests, electrodes of 5/32" diameter were employed to obtain joints on ⅜" plates to provide a single V groove weld having a 60° degree included angle. These test specimens included the production of fusion welds uniting members or plates of dissimilar metals as follows:
E. Nickel-copper alloy* to 18-8 stainless steel**
F. Nickel-copper alloy* to mild steel***
G. Nickel to mild steel***

*Nickel-copper alloy having the composition set forth in Table A.
** Stainless steel of a nominal composition as follows: 18% chromium, 8% nickel, 0.07% carbon, 0.5% manganese, 0.5% silicon and balance iron.
*** Mild steel of a nominal composition as follows: 0.10% carbon, 0.4% manganese, 0.1% silicon, 0.02% phosphorus, 0.03% sulfur and balance iron.

Longitudinal bend tests gave the following results:
E. 62% elongation in ½"
F. 58% elongation in ½"
G. 62% elongation in ½"

Tensile tests on the same joints yielded:
E. 81,100 pounds per square inch tensile strength, fracture in nickel-copper alloy plate
F. 70,000 pounds per square inch tensile strength, fracture in steel plate
G. 64,000 pounds per square inch tensile strength, fracture in steel plate

EXAMPLE 4

In a further test designed to show the performance of the improved welding electrode in the joining of members of mild steel of a composition of from about 0.05% to 0.25% carbon, 0.3% to 0.6% manganese, 0.045% maximum phosphorus, 0.045% maximum sulfur, and the balance iron, two butt joints were made with ⅜" thick steel plate using the same composition electrode as in the previous examples. The welds were cut from the plate leaving about ½" of plate on each side of the joint. The longitudinal bend specimens thus obtained were bent through 180° in a guided bend jig (over ¾" radius). At the completion of the U bend, the weld metal had stretched 32% in ½" at the apex of the bend specimen without failure, indicating a desirable high degree of ductility and satisfactory condition of the fusion metal and absence of cracking.

EXAMPLE 5

In still another test the satisfactory application of the novel welding electrode to the welding of a high nickel steel for sub-zero temperature use was demonstrated. In this instance, the test specimens were composed of two 5" x 10" x 1" thick hot-rolled 8½ nickel steel plate having a composition of substantially 8.6% nickel, 0.75% manganese, 0.26% silicon, 0.10% carbon and the balance essentially iron were joined along the 10" dimension using a standard U groove. The electrodes used had a core wire nominally corresponding to the composition of Table A and were provided with a flux coating of the preferred composition of Table B. The electrodes were 5/32" diameter and the plates were given a 175° F. preheat. Charpy keyhole notch specimens were obtained transverse to the weld with the notch entirely in the weld or at the fusion zone.

Impact tests were then made at minus 320° F. and at room temperature with results shown in Table 3.

TABLE 3

| Temp. of Test | Impact: Foot-Pounds | | | |
|---|---|---|---|---|
| | Notch in Weld | | Notch in Fusion Zone | |
| | As Welded | Stress Relieved | As Welded | Stress Relieved |
| −320° F | 35, 36 | 28 | 22, 26 | 18, 22, 23 |
| +70° F | 35 | | 30 | 25 |

Standard .505" tensile specimens machined transverse to the weld gave room temperature properties as follows:

| | | |
|---|---|---|
| Proportional limit, p. s. i.[1] | 31,000 | 46,000 |
| Yield strength 0.1% offset, p. s. i | 53,000 | 70,500 |
| Yield strength 0.2% offset, p. s. i | 55,750 | 74,000 |
| Tensile strength, p. s. i | 85,000 | 96,250 |
| Reduction of area, percent | 28 | 20 |

[1] p. s. i.=pounds per square inch.

It will be noted that the impact values are well in excess of the 15 foot-pound impact strength requirement of the American Society of Mechanical Engineers' Boiler Construction Code for Unfired Vessels, sec. U142.

EXAMPLE 6

As illustrative of the variation in columbium content of the flux coating, additions of about 0, 6, 11 and 16 parts by weight of ferro-50 columbium were made to a base flux containing about 26 parts by weight of calcium carbonate, about 16 parts calcium fluoride, about 25 parts cryolite, about 25 parts titanium oxide, about 5 parts ferro-85 manganese and about 3 parts bentonite. The effect was evaluated by the production of single layer overlays deposited on mild steel plate and employing a core wire of the composition of Table A. The overlays were stress relieved at about 1150° F. after about one and one-half hours before bending and showed the following comparative results given in Table 4.

TABLE 4

*Per cent elongation at failure*
*(½" gauge length)*

| Parts Fe-50 Cb | 5/32" Diam. Electrode |
|---|---|
|  | Per cent |
| 0 | 36 |
| 6 | 34 |
| 11 | 54 |
| 16 | 56 |

As will be observed, substantially higher ductility was obtained with the employment of about 11–16 parts of ferro-columbium.

EXAMPLE 7

In still a further test, two 5" x 10" x 3/8" nickel-copper alloy plates having the nominal composition of Table A were butt welded using 5/32" diameter electrodes having a core wire corresponding to the composition of Table A and a flux coating conforming to the preferred composition of Table B. The plates were welded with a current of about 135 to about 140 amperes and about 0.357" diameter tensile specimens were machined out of the weld deposit. The all-weld specimens gave properties set forth in Table 5.

TABLE 5

| Specimen No. | Tensile Strength | Elongation (in 1.4") |
|---|---|---|
|  |  | Per cent |
| 1 | 79,200 p. s. i.[1] | 40 |
| 2 | 80,800 p. s. i.[1] | 42 |

[1] p. s. i.=pounds per square inch.

The data obtained in the foregoing welding tests demonstrate that the novel electrode provides for more successful welding operations in the welding or cladding of nickel-copper alloys to steel plate and to other alloy or metal plate, such as 18-8 stainless steel and special ferritic types of nickel steels, and uniting nickel-copper alloys of similar compositions. Moreover, the data demonstrate that satisfactory results are obtainable by the employment of the preferred flux coating containing sufficient amounts of calcium carbonate, the effect of which is to control and keep the carbon at a desirably low level which has been found important in obtaining ductile deposits. While the mechanism of this control is not definitely and fully established, it appears that complex reactions may be involved. Among such reactions, the following appear to be involved when sufficient amounts of calcium carbonate are present:

[1] $CaCO_3 = CaO + CO_2$
[2] $CO_2 + C = 2CO$

With the aforesaid flux coating, deposits containing as little as about 0.05% carbon can be secured, although sufficient carbon was available due to the presence of carbohydrates, etc. to provide about 0.20% or more of carbon in the deposit, as complete theoretical recovery.

The test data further demonstrated that substantial benefits are obtainable by combining with the special flux coating a columbium content in an amount adequate to effectively reduce hot-cracking tendencies and further by incorporating with the flux an effective addition of cryolite to have a favorable influence on weld soundness. While the columbium content is preferably introduced by its inclusion in the flux coating, it may, if desired, be introduced partially or entirely from a core wire columbium content.

In further accordance with the invention as illustrated by the test examples, the flux coating includes titanium in an amount effective to improve arc stability, good slag characteristics and to provide a bead contour minimizing notch stresses which might produce cracking. The electrode in its preferred form also includes aluminum in such amount as to provide improved quality welds and enhance the physical properties of the weld produced therewith. Further advantages obtained by the use of the electrode of the invention include the production of a weld deposit of a character to possess high impact strength at sub-zero temperatures down to at least minus 320° F. as shown by Example 5.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. As illustrative, it is within the scope of the invention to employ a core wire of the nickel-copper alloy type variously modified in its composition, particularly as to the concomitant materials customarily beneficially present in commercial alloys of this type.

We claim:

1. A welding electrode having a core wire of nickel-copper alloy and having a flux coating containing by weight about 26 parts of calcium carbonate, about 16 parts calcium fluoride, about 25 parts of cryolite, about 25 parts of titania, about 5 parts of ferro-85 manganese, about 3 parts of bentonite, about 16 parts of ferro-50 columbium and a binder having about 15 parts of sodium silicate, about 2.5 parts of invert sugar and water, said electrode being characterized by its adaptation for forming weld deposits of a high degree of ductility by a D. C. arc welding operation.

2. A welding electrode having a core wire comprising as its essential elements about 70% nickel and about 30% copper and a flux coating upon the core wire, said flux coating containing by weight about 26 parts of calcium carbonate, about 16 parts of calcium fluoride, about 25 parts of cryolite, about 25 parts of titania, about 5 parts of ferro-85 manganese, about 3 parts of bentonite, about 16 parts of ferro-50 columbium, and a water-dispersible binder from about 10 to about 23 parts exclusive of water, said electrode being characterized by its adaptation for forming weld deposits of a high degree of ductility by a D. C. arc welding operation.

3. A welding electrode having a nickel-copper alloy core wire comprising as its essential ingredients about 70% nickel and about 30% copper and including other elements in small percentages including about 0.50% titanium and about 1.70% aluminum and a flux coating upon the core wire, said flux coating containing by weight about 26 parts of calcium carbonate, about 16 parts of calcium fluoride, about 25 parts of cryolite, about 25 parts of titania, about 5 parts of ferro-85 manganese, about 3 parts of bentonite, about 16 parts of ferro-50 columbium, and a binder composed of about 15 parts of sodium silicate, about 2.5 parts of invert sugar and water, said electrode being characterized by its adaptation for forming weld deposits of a high degree of ductility by a D. C. arc welding operation.

4. A welding electrode having a core wire of nickel-copper alloy and having a flux coating containing by weight from about 20 to 40 parts of calcium carbonate, from about 5 to about 35 parts calcium fluoride, from about 10 to about 35 parts of cryolite, up to about 35 parts of titania, up to about 10 parts of ferro-85 manganese, up to about 5 parts of ferro-40 titanium, from about 2 to about 5 parts of bentonite, from about 6 to about 25 parts of ferro-50 columbium, and a binder containing from about 10 to about 20 parts of sodium silicate and from about 1.5 to about 3 parts of invert sugar, said electrode being characterized by its adaptation for forming weld deposits having a high degree of ductility by D. C. arc welding operations.

5. A welding electrode having a core wire of nickel-copper alloy and a flux coating upon the core wire, said flux coating containing by weight from about 20 to about 40 parts of calcium carbonate, from about 5 to about 35 parts of calcium fluoride, from about 10 to about 35 parts of cryolite, up to about 35 parts of titania, up to about 8.5 parts of manganese, up to about 2 parts of titanium, from about 2 to about 5 parts of bentonite, and a water-dispersible binder from about 11.5 to about 23 parts, said electrode containing columbium in an amount equivalent to about 3 to 12.5 parts of the coating and being characterized by its adaptation for forming crack-free weld deposits having a high degree of ductility by D. C. arc welding operations.

6. A welding electrode having a core wire of an alloy comprising as its essential elements nickel and copper and a flux coating upon the core wire, said flux coating containing by weight from about 20 to about 40 parts of calcium carbonate, from about 5 to about 35 parts of calcium fluoride, from about 10 to about 35 parts of cryolite, up to about 35 parts of titania, up to about 8.5 parts of manganese as ferro-manganese, up to about 2 parts of titanium as ferro-titanium, from about 2 to about 5 parts of bentonite, from about 5.5 to about 8 parts of columbium as ferro-columbium, and a binder containing from about 10 to about 20 parts of sodium silicate, and from about 1.5 to about 3 parts of invert sugar, said electrode being characterized by its adaptation for forming weld deposits of a high degree of ductility by a D. C. arc welding operation.

7. A welding electrode having a nickel-copper alloy core wire and a flux coating upon the core wire, said flux coating containing by weight from about 20 to about 40 parts calcium carbonate, from about 5 to about 35 parts of calcium fluoride, from about 10 to about 35 parts of cryolite, up to about 35 parts of titania, up to about 8.5 parts of manganese as ferro-manganese, up to about 2 parts of titanium as ferro-titanium, from about 2 to about 5 parts of bentonite, from about 3 to about 12.5 parts of columbium as ferro-columbium, and a water-dispersible binder from about 11.5 to about 23 parts, said electrode being characterized by its adaptation for forming weld deposits of a high degree of ductility by a D. C. arc welding operation.

8. As a new composition of matter, a flux coating adapted for use on D. C. nickel-copper arc welding rods, containing by weight from about 20 to 40 parts of calcium carbonate, from about 5 to 35 parts of calcium fluoride, from about 10 to about 35 parts of cryolite, up to about 35 parts of titania, up to about 10 parts of ferro-85 manganese, up to about 5 parts of ferro-40 titanium, from about 2 to about 5 parts of bentonite, from about 6 to about 25 parts of ferro-50 columbium, and a water-dispersible binder from about 11.5 to about 23 parts.

9. As a new composition of matter, a flux coating adapted for use on D. C. nickel-copper arc welding rods, containing by weight from about 20 to 40 parts of calcium carbonate, from about 5 to 35 parts of calcium fluoride, from about 10 to about 35 parts of cryolite, up to about 35 parts of titania, up to about 8.5 parts of manganese as ferro-manganese, up to about 2 parts of titanium as ferro-titanium, from 2 to about 5 parts of bentonite, from about 3 to about 12.5 parts of columbium as ferro-columbium and a water-dispersible binder from about 11.5 to about 23 parts.

THEODORE E. KIHLGREN.
GEORGE R. PEASE.
PIERRE E. LE GRAND.

REFERENCES CITED

The following references are of record in the file of this patent:

UNITED STATES PATENTS

| Number | Name | Date |
|---|---|---|
| 2,422,489 | Kihlgren et al. | June 17, 1947 |
| 2,444,654 | Kihlgren | July 6, 1948 |